2,934,444
GLASS-MAKING MATERIAL AND METHOD

Rowland D. Smith, Corning, N.Y., assignor to Corning Glass Works, Corning, N.Y., a corporation of New York No Drawing. Application April 13, 1955
Serial No. 501,190

6 Claims. (Cl. 106—47)

This invention relates to new $Na_2O$—$B_2O_3$ compositions which are particularly useful as batch materials in the making of glass, and to methods of preparing and using such compositions.

The importance of $Na_2O$ and $B_2O_3$ as glass forming oxides is well recognized in the glass industry, $Na_2O$ having long enjoyed wide use as a glass flux. In recent years $B_2O_3$ has also become a prominent glass-making oxide and is used, for the most part, in conjunction with $Na_2O$. In particular, borosilicate glasses, predominantly $B_2O_3$ and $SiO_2$ but also generally containing a significant amount of $Na_2O$, are well known and widely used for their exceptional characteristics of chemical durability and thermal resistance.

The tendency of boric oxide to escape in significant amounts during melting of such glasses has presented a rather serious problem, however. Not only is there a direct economic loss in terms of batch material but the boric oxide lost exerts a very corrosive influence on the refractory superstructure of the melting unit and regenerative checkerwork thereby necessitating frequent repair or replacement of at least a portion of the glass melting unit. Also the boric oxide-refractory reaction product may drip into the glass and contaminate it to the extent of causing ware rejection. Further, since the amount of boric oxide lost may vary considerably depending on melting conditions, batch compensation is essentially an empirical matter, thus rendering it difficult to accurately control glass composition and physical properties.

Heretofore, borax, either in the hydrated form, $Na_2B_4O_7 \cdot 10H_2O$, or in the anhydrous state, and boric acid, $H_3BO_3$, have been the raw materials commonly used as sources of $B_2O_3$ in glassmaking. Borax has been considered particularly desirable since it occurs as a product of nature and is a source of both $B_2O_3$ and $Na_2O$, the two oxides being supplied by borax in a fixed ratio of 2 mols $B_2O_3$ to 1 mol $Na_2O$, that is 69% $B_2O_3$ and 31% $Na_2O$ by weight on an anhydrous basis. Usually, however, a higher $B_2O_3/Na_2O$ ratio is desired, particularly in borosilicate glass compositions. While hydrated crystalline borates, such as the material known as sodium dekaborate and pentaborate, have been proposed as batch materials there does not appear to have been any economically practical method of producing such borax substitutes. It has been customary therefore to employ borax and supplement it with a sufficient amount of boric acid to achieve the desired oxide ratio.

An extensive study of glass melting operations has shown that loss of $B_2O_3$ during such operations is largely associated with the presence of $H_3BO_3$ in the batch and occurs primarily in the interval before $B_2O_3$ chemically combines with other oxides in the fusion process. It further appears that the loss is seriously aggravated by the presence of water, particularly in the batch itself. In this connection it is thought that evaporation of water from the batch removes $B_2O_3$ in a manner closely resembling steam distillation.

While serious efforts have been directed at the production and use of completely anhydrous or dry batches, prior to the present invention only a limited degree of success has been achieved in this direction. The use of anhydrous or dehydrated borax has been adopted to some extent and, where feasible, glass batches have been maintained free of extraneous or uncombined water. However, as previously indicated, borax can seldom be used as the sole source of $B_2O_3$ because of the fixed $B_2O_3/Na_2O$ ratio. Accordingly, the success of such efforts has hinged on finding a method of using, or substituting for, boric acid. While anhydrous $B_2O_3$ can be produced from boric acid, it is such a hygroscopic material that it has never been found feasible to store and handle it except in small amounts which could be kept in sealed containers. As a result, commercial glass-making practice has generally been to continue use of the conventional batch materials, accept some loss of $B_2O_3$ as inevitable, and adopt empirical compensation as the only practical solution.

Accordingly then it is highly desirable to combine boric acid and borax in any selected proportions prior to their introduction into a glass batch and it is a primary purpose of this invention to provide such materials and a means of producing them.

It is well known that substantially all of the water present in a glass batch is evaporated during the melting process and that a substantial amount of heat is required for such evaporation, thereby necessitating extra fuel consumption. Furthermore, transportation is often a substantial factor in the cost of glassmaking materials and, to the extent that such materials contain water, represents an economic loss. It is, therefore, a further purpose of this invention to precombine borax and boric acid into a material which may be substantially free from water.

I have now discovered new borate compositions that can be synthesized from borax and boric acid by heating these materials to a temperature at which substantially complete dehydration or release of chemically combined $H_2O$ occurs. I have further found that such borate compositions can be used as glass-making batch materials and, when so used, substantially avoid the problems heretofore encountered. This enables markedly better control of batch composition and melting practice as well as substantially lower costs, particularly in borosilicate glasses.

The new compositions are composed essentially of $B_2O_3$ and $Na_2O$ in a molar ratio greater than 2/1 and are substantially free of combined water. In other words, the new compositions contain more than 69% $B_2O_3$ and less than 31% $Na_2O$ on an anhydrous weight basis. While the exact chemical nature of these new compositions is not entirely clear they apparently represent a chemical combination of the parent substances, borax and boric acid, with release of the chemically combined water present in each of such parent substances. In view of the variable $B_2O_3/Na_2O$ ratio obtainable in the new compositions they are hereafter referred to as sodium polyborates for convenience.

The simplest procedure for synthesizing the new sodium polyborates involves forming a physical intermixture, preferably finely divided, of borax and $H_3BO_3$ in proper proportions and heating this mixture to a temperature at which fusion occurs, such temperature being about 800° C. In the course of fusion a chemical interaction as well as substantial dehydration appears to occur. However, in carrying out such process it is found that considerable $B_2O_3$ loss may occur in much the same manner as such loss occurs during glass melting.

I have further found that this loss can be substantially avoided if hydrated borax and boric acid are mixed in the proper selected proportions in a closed container such as an autoclave or sealed heating chamber and the mixture heated to a temperature of about 120° C. to carry out the desired freeing of water from, and combination of, the ingredients. Under these conditions it has been found that the water chemically combined with the parent materials is released from such materials, but is retained within the mixture in sufficient quantity to form a clear fluid mass. In this fluid state, which apparently is a solution of the dehydrated materials, the desired interaction is greatly facilitated. Higher temperatures may be used if desired, the optimum temperature varying somewhat with such factors as amount of material, container size and degree of pressure.

Subsequent to completion of the interaction the container may be opened and the released water evaporated if desired. Preferably, however, the reacted material is expelled under pressure from the container in the form of a spray or thin stream. By removing the hot material in this manner the released water evaporates rapidly and with the aid of conventional spray drying techniques or the like, the material may be collected in a substantially dry form if desired. Tests indicate that, by using this preferred method, $B_2O_3$ loss is reduced to 10-20% of that encountered with open firing to the fusion temperature.

A particular feature of the new polyborate materials is the ability to provide in such material any predetermined $B_2O_3/Na_2O$ ratio greater than the 2/1 ratio which characterizes anhydrous borax or sodium tetraborate. Hence in preparing any given composition the relative proportions or amounts of borax and boric acid to be employed will depend on the $B_2O_3/Na_2O$ ratio desired and may be calculated in accordance with standard glass making practice.

While the new polyborate compositions may be produced with any desired $B_2O_3/Na_2O$ molar ratio, it is preferred that the $Na_2O$ content be not less than about 14% by weight for glass making purposes. In other words, the molar ratio should preferably be not more than about 16/3, which corresponds approximately to 14% $Na_2O$ by weight. Thus, the $Na_2O$ content by weight should be within the range between about 14% and 31%. (Unless otherwise indicated all references to percentages by weight in connection with the subject compositions are based on anhydrous compositions.) Polyborates with lower $Na_2O$ contents tend to exhibit somewhat inferior keeping properties and a tendency to lose $B_2O_3$ through the action of atmospheric moisture during glass melting.

The keeping property of a material refers to the relative ability of the material to be stored in a moist atmosphere without picking up moisture and becoming difficult to handle and of uncertain composition. To be considered a good keeper, a material should remain relatively dry and stable in storage. As previously indicated, a serious deficiency of anhydrous $B_2O_3$ as a batch material is its tendency to readily pick up moisture, in other words to be a very poor keeper. In contrast a principal advantage of the new polyborates, over and above ability to retain $B_2O_3$, lies in their relatively good keeping properties.

In connection with the present invention a rather simple, accelerated measure of keeping properties has been devised which consists in exposing small amounts of a material to a controlled humidity for an extended length of time and thereafter measuring the percentage moisture pick-up by the material. In testing the relative merits of the new polyborate materials a few grams of each material in finely divided form was exposed to a 66% relative humidity for a period of 500 hours and then weighed to determine the amount of moisture taken up. Anhydrous borax, a material recognized on the basis of commercial experience as having good keeping properties, was included as a standard of comparison.

The results of the test are shown in Table I below with the polyborate materials being identified by their $Na_2O$ content in percent by weight.

Table I

| Material | Percent Gain in Wt. |
| --- | --- |
| Anhydrous borax | 25 |
| Polyborate—18% $Na_2O$ | 6 |
| Polyborate—15% $Na_2O$ | 14 |
| Polyborate—14.4% $Na_2O$ | 27 |
| Polyborate—13.8% $Na_2O$ | 42 |
| Polyborate—10% $Na_2O$ | 54 |
| Polyborate—3% $Na_2O$ | 69 |

In producing glass in commercial tanks or other large melting units, it is customary to fire or heat the unit with gas or oil. Inevitably, some water vapor is introduced into the tank atmosphere during combustion. It is known that such water vapor in the melting atmosphere can exert a tendency to extract $B_2O_3$ in much the same manner as does water in the glass batch. Therefore, another required quality in a good raw material is the ability to resist such atmospheric extraction tendency. A simple accelerated test of this quality in a raw material consists in heating a sample of the material to an elevated temperature, say about 300° C., and then introducing a steam atmosphere over the sample. By measuring the $B_2O_3$ content of the sample both before and after the steam flush, it is possible to determine the loss, if any, incurred as a result. The results of a test of this sort made on various polyborate materials, and on anhydrous borax as a comparative standard, are included in Table II below with the polyborates again being identified by their $Na_2O$ content in percent by weight.

Table II

| Material | Percent $B_2O_3$ | |
| --- | --- | --- |
| | Before Flush | After Flush |
| Anhydrous borax | 68.5 | 68.5 |
| Polyborate—15% $Na_2O$ | 84.2 | 83.2 |
| Polyborate—14% $Na_2O$ | 85.4 | 84.2 |
| Polyborate—12% $Na_2O$ | 87.5 | 83.3 |
| Polyborate—1% $Na_2O$ | 96.6 | 71.9 |

These tests indicate then that polyborates containing over about 14% $Na_2O$ are comparable to or better than anhydrous borax as glass batch materials and have the distinct advantage of composition flexibility, that is an adjustable $B_2O_3/Na_2O$ ratio. However, below about 14% $Na_2O$ the keeping and distillation characteristics depreciate rapidly and hence render the materials less desirable for use.

By way of further specific illustration reference is made to the commercial melting in a large, gas-fired tank of a borosilicate glass having the following approximate composition: $SiO_2$ 77%, $Na_2O$ 4.5%, $B_2O_3$ 15%, $Al_2O_3$ 2%, and minor amounts of other ingredients totalling 1.5%. It will be understood that, except as otherwise indicated, the glass may be melted in accordance with conventional practice as described for example by S. R. Scholes in chapter XII of his "Modern Glass Practice," Rev. Ed., Industrial Publications, Inc., Chicago, 1948.

Initially this glass was melted from a batch to which the $B_2O_3$ content was supplied by including 122 parts by weight of $H_3BO_3$ and 116 parts anhydrous borax. When analyzed the glass was found to contain about 14.5% $B_2O_3$ as compared to about 15% based on batch calculations. The 0.5% discrepancy or loss was equivalent to somewhat more than 3% of the total $B_2O_3$ added to the batch.

Subsequently the glass was melted under substantially the same conditions except that the boric acid was completely removed from the batch, the anhydrous borax was reduced to 4.5 parts and 180 parts of a sodium polyborate containing about 18% $Na_2O$ was added by way of substitution. Upon analysis, the discrepancy between the analytical and theoretical $B_2O_3$ content was within the limits of analytical error, the average of a number of analyses actually being a few hundreds of a percent above the calculated content. Thus any loss of $B_2O_3$ was so small as to not be determinable by ordinary means.

While the sodium polyborates of the present invention are particularly useful as one of the ingredients in borosilicate glass batches, and have been described in connection with the melting of such a glass, they are, of course, capable of much wider use as substitutes for previously known borate materials. In particular they may be used in melting of any glass the composition of which includes the oxides of both sodium and boron.

What is claimed is:

1. In the melting of glasses containing $Na_2O$ and $B_2O_3$, the improvement which comprises introducing at least a substantial portion of the $Na_2O$ and $B_2O_3$ into the glass batch in the form of a sodium polyborate which is substantially free from chemically combined water and which is composed, on an oxide basis, of $B_2O_3$ and $Na_2O$ with the content of $Na_2O$ being at least 1% but less than 31% and the remainder, on an anhydrous weight basis, being $B_2O_3$.

2. The improved method of claim 1 which additionally comprises forming the sodium polyborate by chemically combining a mixture of boric acid and borax.

3. In a method of producing glass wherein both boric acid and borax are employed as batch materials, the improvement which comprises chemically combining at least a portion of each of these raw materials into a synthetic sodium polyborate which is substantially free from chemically combined water and which is composed, on an oxide basis, of $B_2O_3$ and $Na_2O$ with the content of $Na_2O$ being at least 1% but less than 31% and the remainder, on an anhydrous weight basis, being $B_2O_3$, and employing such polyborate as a batch material.

4. A method of forming a sodium polyborate composed of $B_2O_3$ and $Na_2O$, wherein the content of $Na_2O$ is at least 1% but less than 31% and the remainder, on an anhydrous weight basis, being $B_2O_3$, which comprises reacting a mixture of borax and boric acid with the release of substantially all of the chemically combined water in the parent materials.

5. A method of forming a sodium polyborate in accordance with claim 4 wherein the mixture of borax and boric acid is heated in a closed container to a temperature of about 120° C. to effect interaction of the materials and release of chemically combined water.

6. A method in accordance with claim 5 which further includes releasing the heated reaction product from the container under pressure whereby the reaction product is at least partially dried by evaporation.

References Cited in the file of this patent
UNITED STATES PATENTS

| | | |
|---|---|---|
| 2,096,266 | Suhr | Oct. 19, 1937 |
| 2,722,519 | Ottey et al. | Nov. 1, 1955 |

FOREIGN PATENTS

| | | |
|---|---|---|
| 293,410 | Switzerland | 1953 |

OTHER REFERENCES

Mellor: Comprehensive Treatise on Inorganic and Theoretical Chemistry, v. 5, pages 66, 70 (1924).

Chem. Abstracts 31, 9348; 32, 4163; 41, 7693[a]; 47, 3534[b], 3664[h], 11842[h]; 48, 14141[e].

Morey: Properties of Glass, 2nd edition (1954), page 236.